UNITED STATES PATENT OFFICE.

EDWARD A. DIETERLE AND SAUL D. SEMENOW, OF PITTSBURGH, PENNSYLVANIA, ASSIGNORS TO THE KOPPERS COMPANY, OF PITTSBURGH, PENNSYLVANIA, A CORPORATION OF PENNSYLVANIA.

PURIFICATION OF LIQUIDS.

1,323,256. Specification of Letters Patent. Patented Dec. 2, 1919.

No Drawing. Application filed February 15, 1919. Serial No. 277,181.

*To all whom it may concern:*

Be it known that we, EDWARD A. DIETERLE and SAUL D. SEMENOW, both citizens of the United States, and both residing at Pittsburgh, Allegheny county, Pennsylvania, have invented a new and useful Improvement in Purification of Liquids, of which the following is a full, clear, and exact description.

The present invention relates to the purification of liquids and particularly to the purification of the waste liquors from industrial plants so that they may be discharged into streams without polluting the stream water. The invention is described with particular reference to its embodiment in a process of purifying the waste liquor from the ammonia stills of the by-product coke industry.

It is to be understood, however, that the invention is not limited in its application to this industry but may be otherwise employed.

Referring to the process as employed for treating the waste ammonia still liquor:—

The raw ammonia still waste has objectionable properties which should be removed before it is discharged into a stream, in order to prevent the pollution of the water thereby. The objectionable properties of the ammonia still waste are its harmful effect on fish, its disagreeable odor, its disagreeable taste and its dark color. These properties are largely due to the presence of phenoloid bodies, thiocyanates and sulfids. Small traces of pyridin and other organic compounds not yet identified may contribute to its harmful or disagreeable qualities.

Besides the above impurities there are large quantities of calcium salts, principally calcium chlorid, present in the waste liquor. However, since the waste liquor is greatly diluted in the stream to which it is finally drained, the presence of these salts is not particularly objectionable. The present process has to do particularly with the removal of those substances of the ammonia still waste which give it its harmful effect on fish, its disagreeable odor and taste and its dark color.

The ammonia still waste liquor is drawn from the still hot and while hot is aerated, preferably by running it through an aeration tower filled with baffles, coke or other material over which the liquor trickles in contact with the air. This causes some evaporation of the water and thereby concentrates the liquor to some extent. It also permits the evaporation of some of the volatile constituents of the liquid and thereby gets rid of some of the disagreeable odor. The aeration of the liquid also causes a more ready precipitation of the solids in the subsequent step of treatment in the settling tank. While it is preferred to aerate the liquor, this step may be omitted.

The liquor is next run into a settling tank where it remains for about twenty-four hours. During this time about 95% of the precipitable solids settle out of the liquid.

The liquid is drawn next from the settling tank and filtered through an inorganic material, preferably granulated blast furnace slag. This filtration completes the removal of the solids which do not settle out in the settling tank and also removes the tarry matter from the liquor and if the slag employed contains iron oxids such as are found in the "spent" slag which results from the treatment of mine water by the process of the Heckman patent, 1,171,046, of February 8th, 1916, the sulfids are also removed from the liquor. The sulfids exist in the liquor principally as calcium sulfids. The spent blast furnace slag also partially removes some of the cyanogen compounds. While it is preferred to use the slag with the iron oxids resulting from the treatment of mine water or the like, the iron oxids might be otherwise supplied to the slag or inorganic filtering material used for this step of the process.

The filtered liquor may be treated for the removal and recovery of cyanogen compounds. This is preferably accomplished by the addition to the liquor of a compound, such as a ferrous salt, which will precipitate the ferrocyanids followed by the addition of cupric sulfate and ferrous sulfate, which results in the precipitation of cuprous thiocyanate. This step may be omitted if desired.

The above recited steps are for the purpose of preliminarily clarifying the liquor, whereby the burden placed upon the peat filter bed is lessened.

The next step in the process is the treatment of the liquor with peat. This treatment is preferably carried out by filtering the liquor through a mass of peat.

We have found that a filter bed of peat a foot or more in thickness is satisfactory. Such filtration permits a rapid treatment of the liquor and effects a maximum removal of the phenoloid bodies with a minimum of filtering material. This treatment results in the final separation of the remaining constituents which gave the liquor its harmful qualities, disagreeable taste, smell and dark color. The liquor after the peat treatment is substantially colorless and substantially odorless, and when diluted in the stream is non-poisonous to fish life and not harmful to the water for drinking purposes.

Certain industrial waste liquors which contain a minimum of solid impurities, sulfur and cyanogen compounds, for example the effluents from certain ammonia stills, may be treated directly with the peat without any preliminary treatment of the liquor.

The liquor purified by the peat treatment, may if desired, be passed through an earth filter bed to effect a more complete removal of impurities before flowing into the stream.

While the preferred embodiment of the invention has been specifically described, it is to be understood that the invention is not limited to such embodiment and that some of the steps may be omitted and other variations may be made within the scope of the following claims:

We claim:

1. The herein described process of purifying liquors containing phenoloid bodies, comprising, filtering the material through a filter bed containing peat; substantially as described.

2. The herein described process of purifying waste ammonia still liquors, comprising, preliminarily clarifying the liquor and then filtering it through a filter bed containing peat; substantially as described.

3. The process of purifying waste ammonia still liquors which consists in aerating the liquor, separating the solids therefrom by settling, filtering the liquor through an inorganic filtering material and then filtering the liquor through a filter bed containing peat; substantially as described.

4. The process of purifying waste ammonia still liquors, comprising, treating the liquor with an iron oxid-containing material, and thereafter filtering the liquor through a filter bed containing peat; substantially as described.

5. The process of purifying waste ammonia still liquors, comprising, filtering the liquor through blast furnace slag and thereafter filtering the liquor through a filter bed containing peat; substantially as described.

6. The herein described process of purifying waste ammonia still liquors, comprising, preliminarily filtering the liquor, removing the cyanogen compounds from the liquor, and thereafter filtering the liquor through a filter bed containing peat; substantially as described.

In testimony whereof we have hereunto set our hands.

EDWARD A. DIETERLE.
SAUL D. SEMENOW.